US011416070B2

(12) United States Patent
Tao et al.

(10) Patent No.: US 11,416,070 B2
(45) Date of Patent: *Aug. 16, 2022

(54) APPARATUS, SYSTEM AND METHOD FOR DYNAMIC MODIFICATION OF A GRAPHICAL USER INTERFACE

(71) Applicant: Intel Corporation, Santa Clara, CA (US)

(72) Inventors: Jiancheng Tao, Shanghai (CN); Hong Wong, Portland, OR (US); Xiaoguo Liang, Shanghai (CN); Yanbing Sun, Shanghai (CN); Jun Liu, Shanghai (CN); Wah Yiu Kwong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,355

(22) Filed: Mar. 29, 2021

(65) Prior Publication Data
US 2021/0216137 A1    Jul. 15, 2021

Related U.S. Application Data

(63) Continuation of application No. 15/282,475, filed on Sep. 30, 2016, now Pat. No. 10,963,044.

(51) Int. Cl.
*G06F 3/01* (2006.01)
*G06T 3/40* (2006.01)
(Continued)

(52) U.S. Cl.
CPC .............. *G06F 3/012* (2013.01); *G06F 3/013* (2013.01); *G06F 3/0304* (2013.01);
(Continued)

(58) Field of Classification Search
CPC ........ G06F 3/012; G06F 3/013; G06F 3/0304; G06F 3/04845; G06F 40/103;
(Continued)

(56) References Cited

U.S. PATENT DOCUMENTS 5,574,836 A    11/1996    Broemmelsiek
9,704,216 B1    7/2017    Laskar et al.
(Continued)

FOREIGN PATENT DOCUMENTS

KR    20030097310 A    * 12/2003
KR    20090023917        3/2009

OTHER PUBLICATIONS

International Searching Authority, "International Search Report," issued in connection with International Patent Application No. PCT/US2017/047912, dated Nov. 23, 2017, 3 pages.
(Continued)

*Primary Examiner* — Jeffery A Brier
(74) *Attorney, Agent, or Firm* — Hanley, Flight & Zimmerman, LLC

(57) ABSTRACT

Methods, apparatus, systems are disclosed for altering displayed content on a display device responsive to a user's proximity. In accord with an example, a computing system includes a memory, a sensor to collect data representative of a viewing distance between a display and a user of the display, and a scaler to adjust a size of at least one object displayed by the display based on the viewing distance from the display.

28 Claims, 10 Drawing Sheets

(51) Int. Cl.
*G09G 5/00* (2006.01)
*G06F 3/03* (2006.01)
*G06F 3/04845* (2022.01)
*G06F 40/103* (2020.01)
*G06V 40/10* (2022.01)
*G06V 40/16* (2022.01)
G09G 5/14 (2006.01)
G09G 5/26 (2006.01)

(52) U.S. Cl.
CPC ........ *G06F 3/04845* (2013.01); *G06F 40/103* (2020.01); *G06T 3/40* (2013.01); *G06V 40/103* (2022.01); *G06V 40/169* (2022.01); *G09G 5/00* (2013.01); *G06F 2203/04803* (2013.01); *G06F 2203/04806* (2013.01); *G06T 2200/24* (2013.01); *G06V 40/172* (2022.01); *G09G 5/14* (2013.01); *G09G 5/26* (2013.01); *G09G 2340/045* (2013.01); *G09G 2340/0407* (2013.01); *G09G 2354/00* (2013.01)

(58) Field of Classification Search
CPC ............ G06F 2203/04803; G06F 2203/04806; G06K 9/00275; G06K 9/00369; G06T 3/40; G06T 2200/24; G09G 2340/045; G09G 2354/00; G09G 5/391; G09G 5/00; G09G 5/14; G09G 5/26; G09G 2340/0407; G06V 40/103; G06V 40/169; G06V 40/172
See application file for complete search history.

(56) References Cited

U.S. PATENT DOCUMENTS

| 10,963,044 | B2* | 3/2021 | Tao ........................ G06F 3/0304 |
| 2003/0210258 | A1 | 11/2003 | Williams | |
| 2003/0234799 | A1 | 12/2003 | Lee | |
| 2009/0141147 | A1 | 6/2009 | Alberts et al. | |
| 2012/0287163 | A1 | 11/2012 | Djavaherian | |
| 2013/0044135 | A1 | 2/2013 | Lee et al. | |
| 2013/0176345 | A1 | 7/2013 | Kim et al. | |
| 2014/0118354 | A1 | 5/2014 | Pais et al. | |
| 2014/0168274 | A1 | 6/2014 | Wang et al. | |
| 2015/0009238 | A1 | 1/2015 | Kudalkar | |
| 2015/0242993 | A1 | 8/2015 | Raman | |
| 2015/0277548 | A1 | 10/2015 | Imai | |
| 2016/0139673 | A1* | 5/2016 | Salamon .................. G06T 3/60 345/156 |
| 2018/0095528 | A1 | 4/2018 | Tao et al. | |

OTHER PUBLICATIONS

International Searching Authority, "Written Opinion," issued in connection with International Patent Application No. PCT/US2017,047912, dated Nov. 23, 2017, 10 pages.

United States Patent and Trademark Office, "Non-Final Office Action," issued in U.S. Appl. No. 15/282,475, dated Nov. 2, 2017, 23 pages.

United States Patent and Trademark Office, "Final Office Action," issued in U.S. Appl. No. 15/282,475, dated Mar. 28, 2018, 14 pages.

United States Patent and Trademark Office, "Advisory Action," issued in U.S. Appl. No. 15/282,475, dated Jun. 21, 2018, 3 pages.

United States Patent and Trademark Office, "Notice of Allowance and Fee(s) Due," issued in U.S. Appl. No. 15/282,475, dated Nov. 24, 2020, 12 pages.

* cited by examiner

APPARATUS, SYSTEM AND METHOD FOR DYNAMIC MODIFICATION OF A GRAPHICAL USER INTERFACE

RELATED APPLICATIONS

This patent arises from a continuation of U.S. patent application Ser. No. 15/282,475, now U.S. Pat. No. 10,963,044, filed on Sep. 30, 2016. U.S. patent application Ser. No. 15/282,475 is hereby incorporated herein by reference in its entirety.

FIELD OF THE DISCLOSURE

This disclosure relates to graphical user interfaces and, more particularly, to apparatus, system and method for dynamic modification of a graphical user interface.

BACKGROUND

Conventional graphical user interfaces include a number of settings by which a user is enabled to modify the graphical user interface to suit the needs of a user. For example, users are able to select fonts, font sizes, contrast, magnification, window size, and the like. These settings are typically accessed through displayed soft buttons or sliders, a drop down menu listing, or a pop-up menu selection.

Figure 1:
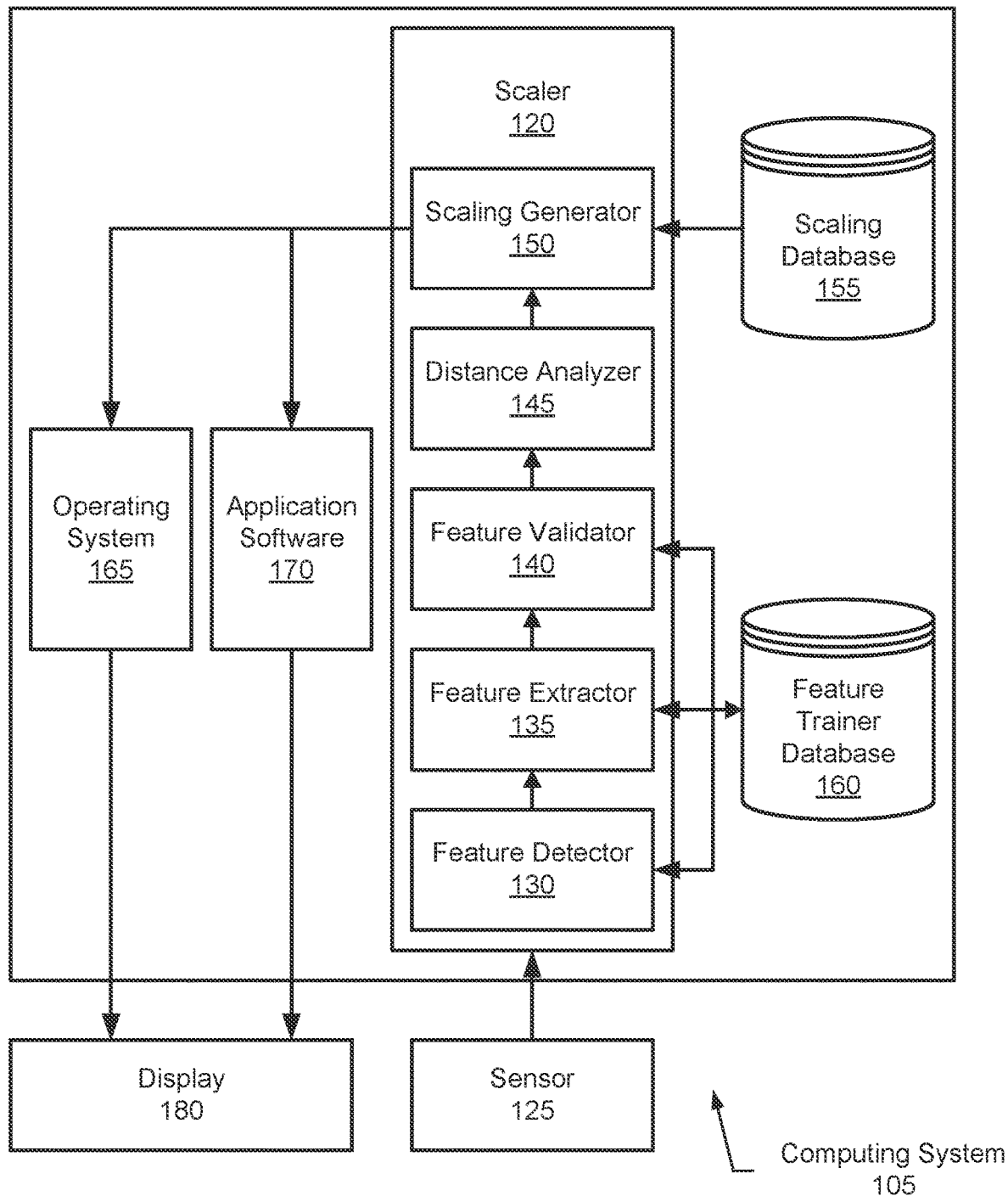
FIG. 1 is a block diagram of an example system to implement the concepts disclosed herein.

While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

In the following description, numerous specific details are set forth to provide an understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

As noted above, conventional graphical user interfaces include a number of settings by which a user is enabled to modify the graphical user interface to suit the needs of a user. For example, users are able to select fonts, font sizes, contrast, magnification, window size, and the like. As one example, a user of Microsoft® Windows® Word desiring to change a magnification of a displayed document would, depending on the exact version of Word, access a magnification ("Zoom") slider in the status bar using the cursor, select the movable bar and move the selected bar to the left (decrease magnification) or the right (increase magnification). Alternatively, the user would access the Menu Bar "View," Click on the "Zoom" soft button, and then proceed to enter desired inputs into a Zoom pop-up window. Likewise, in Microsoft® Internet Explorer®, a user desiring to change a Zoom level would, depending on the exact version of Internet Explorer® (e.g., Version 11.0.9600.18314, Update Version 11.0.31), access a settings menu by moving the cursor to a Settings icon and selecting the icon to cause a drop-down listing to be revealed, such listing including a selection for "Zoom." Once "Zoom" has been selected from the drop-down listing, another pop-up listing is presented with yet additional selections for modifying a display magnification. Similarly, if a user desires to change a text size, the user accesses the "View" button in the Menu Bar, scrolls down the listing of options to "Text Size" and then, upon selection of "Text Size," the user is presented with selections for "Largest," "Larger," "Medium," "Smaller," and "Smallest."

The "native" display resolution is the exact number of pixels on the physical screen for a display, such as a liquid-crystal display (LCD), light-emitting diode (LED) display, organic light-emitting diode (OLED) display, or plasma display panel (PDP). For example, the native resolution of a 4K display may be 3840×2160, where the display is, physically, 3840 pixels along a horizontal axis and 2160 pixels along a vertical axis. An example 27" 4K UHD (ultra-high-definition) 16:9 display includes 8.3 million pixels (8.3 megapixels) on a screen with a resolution of 3840×2160.

At higher resolutions, displayed items appear sharper and smaller, whereas at lower resolutions displayed items appear less defined, but larger, with fewer items fitting on the screen. Such pixel-based displays are configurable to display one or more "supported" resolutions other than the native resolution, wherein the pixels are used to electronically emulate one or more supported non-native display resolutions. For example, through one version of Microsoft Windows, a screen resolution may be changed by a user by accessing and actuating the Control Panel button or link, and under "Appearance and Personalization," actuating the "Adjust Screen Resolution" button or link, which then reveals a "Resolution" drop-down list providing a slider enabling selection of a variety of alternative, non-native resolutions. Following selection of a desired resolution (e.g., 1920×1080, etc.) and actuation of the "Apply" button, the display device alters the displayed resolution according to the selected resolution and prompts the user to verify acceptability of the displayed resolution.

A perceived resolution of a display is further influenced by the pixels per inch (PPI), or pixel density, of the display and a relation between the user and the display represented as pixels per degree (PPD), which takes into account viewing distance. For a "Retina" display having a pixel density or about 300 or more PPI, a user is generally unable to discern individual pixels at a normal viewing distance (about 10"-12" from the eye for a handheld device). The PPI may be alternatively expressed as a size-independent unit of pixels-per-degree (PPD), which takes into account both the display resolution and a distance from which the device is viewed. The PPD parameter is dependent on the distance between the display and the eye of the person viewing the display. Thus, moving the eye closer to the display reduces the PPD and moving the eye away from the display increases the PPD in proportion to the distance. PPD may be expressed as $2*d*r*\tan(0.5°)$, where "d" is the distance to the display and "r" is the resolution of the screen in pixels per unit length (e.g., inches, etc.). To illustrate, using an iPhone 6s Plus as an example, which has a 5.5" 1080×1920 pixel display, a viewing distance of 10" yields a visual density at center of 70.3 PPD, whereas as a viewing distance of 11" yields 77.3 PPD and a viewing distance of 12" yields 84.2 PPD.

As the native resolution and pixel densities have increased to the now conventional, but not yet ubiquitous, 4K displays, the present inventors have observed that a native resolution of the higher resolution displays present practical difficulties in usage in that the inputs (e.g., tabs, soft buttons, etc.), navigation aids (e.g., cursors, icons, etc.) and text are difficult to discern when the viewing distance from the display increases even slightly. Further, the present inventors observed that in all-in-one ("AIO") large touchscreen computers using a wireless keyboard to "surf the web," the font size is too small to be discerned from a distance.

The teachings herein provide a customizable and adaptive solution to users of all high resolution displays that selectively adjusts a display device setting and/or an application software setting, collectively referred to herein as a display mode, responsive to the user's viewing distance and/or relative changes in the user's viewing distance relative to the display. An example display system consistent with teachings herein uses a distance sensing device, or the like, to adaptively increase a display resolution as a user moves toward the display, relative to a datum, and adaptively decrease a display resolution as the user moves away from the display, relative to the datum. For instance, the datum represents a default user position or default viewing position, such as a user's normal seated position in a chair in front of the display, wherein the display is set to a first display mode (e.g., a first combination of operating system settings (e.g., a display resolution, a display bit rate, a display contrast, a display sharpness, etc.) and application settings (e.g., graphical element(s), navigation element(s), text, image(s), font(s), etc.)), wherein the display resolution setting corresponds to the display native resolution. In this example implementation, the user is further enabled to select one or more other display modes (e.g., different combinations of operating system settings and/or application settings, such as adjustment of the display resolution to non-native resolutions or adjustments to one or more application software graphical element(s), navigation element(s), text, image(s), font(s), contrast, bit rate, sharpness, etc.) for a scaler to automatically implement responsive to predetermined movements of the user relative to the display device. Advantageously, in an example implementation, the user is still further enabled to select one or more other display modes on a region-by-region and/or object-by-object level of the displayed content, with the scaler automatically implementing user-selected changes as to such region(s) and/or object(s) responsive to movements of the user relative to the display device.

FIG. 1 shows an example computing system 105 including an example scaler 120 receiving an input from an example sensor 125. In some examples, the example scaler 120 is implemented in hardware circuitry, software code, and/or a combination thereof. The example scaler 120 includes an example feature detector 130, and example feature extractor 135, an example feature validator 140, and example distance analyzer 145, and an example scaling generator 150, which accepts inputs from scaling database 155. Inputs into the example scaler 120 further include an example feature trainer database 160. An output of the example scaler 120 is provided to an example operating system 165 (or systems software) and/or example application software 170 (e.g., database programs, word processors, Web browsers, spreadsheets, or other end-user programs), which collectively control the example display 180 and displayed content.

In FIG. 1, the example scaler 120 includes an example feature detector 130, an example feature extractor 135, and example feature validator 140 operatively associated with an example feature trainer database 160. These components are optionally included in an example implementation wherein the example sensor 125 is used to determine an identity of a user, via facial recognition, and/or a distance of a particular body part of a user (e.g., eyes, nose, head, shoulders, etc.) to more accurately determine a distance between the example display 180 and the eyes of a user of the display. In such example implementation, one suitable example sensor 125 is an Intel® RealSense™ SR300 camera or an Intel® RealSense™ R200 camera and the example feature trainer database 160, the example feature detector 130, the example feature extractor 135, and the example feature validator 140 utilize Intel® RealSense™ Technology, which may utilize, by way of example, the Intel® RealSense™ Cross Platform API and the Intel® RealSense™ SDK as appropriate to the operating system, firmware, and hardware of the example computing system 105. The Intel® RealSense™ SR300 camera and the Intel® RealSense™ R200 camera provide facial recognition and feature recognition capabilities, including an ability to track landmarks (e.g., eyes, nose, etc.) and detect pose and expression.

The example sensor 125 includes, in at least some examples, a camera, an infrared camera, an infrared laser projector, a range camera (e.g., a stereo camera or a time-of-flight camera), an infrared distance sensor, a Perc camera, a laser rangefinder, an infrared sensor, an audio sensor, and/or a combination thereof. In application, the example sensor 125 directly measures a distance between the user and the display 180 or, alternatively, measures a variable correlatable to a distance between the user and the display 180. This measurement of the distance optionally includes feature recognition, as noted above, or may omit feature recognition and the associated example feature detector 130, example feature extractor 135, example feature validator 140, and example feature trainer database 160.

In one example, sensor 125 includes a Sharp GP2Y0A21YK0F IR distance measuring sensor, which includes an integrated combination of PSD (position sensitive detector), IRED (infrared emitting diode) and signal processing circuit, which adopts a triangulation method to minimize influence of variations in object reflectivity, environmental temperature and operating duration. In yet another example, the sensor 125 includes a combination of a 1080p HD camera, an infrared camera, and an infrared laser projector. The example sensor 125 may alternatively include an ultrasonic sensor which determines a distance by evaluating the time interval (time-of-flight) between an emitted ultrasonic signal and the received echo reflected by an object, here the user of the example computing system 105. An example ultrasonic sensor 125 includes a Telesky HC-SR04 Ultrasonic Distance Measuring Sensor Module, manufactured by Telesky International Limited, Guangdong, China.

In yet another example, the sensor 125 includes a wearable transponder borne by the user (e.g., worn on the head, worn on the body, etc.) to provide user distance measurement data directly to the distance analyzer 145, as the example feature detector 130, example feature extractor 135, and example feature validator 140 are not required. An example distance analyzer 145 uses a time difference between interrogation and reply, subject to any required corrections (e.g., transponder delay) and converts the time difference to a distance measurement. In some examples, the wearable transponder may include, for example, a Near Field Communication (NFC) device or an active high frequency (HF) or ultra-high frequency (UHF) RFID transponder or beacon.

The example feature trainer database 160 is a database of features (e.g., facial features, etc.), or derivatives or constructs thereof (e.g., eigenfaces, templates for template matching, etc.), extracted by the example feature extractor 135 from a user of the example computing system 105 during one or more training sessions in which the user presents such features to the example sensor 125 for detection by the example feature detector 130.

The example feature extractor 135 uses conventional feature or facial recognition algorithms (e.g., geometric algorithms, photometric recognition algorithms, Haar basis functions, Viola-Jones algorithm, etc.) to devolve such features into a form or a template suitable for retention by the example feature trainer database 160, during a training session, or to devolve such features into a form suitable for comparison to prior-stored user features (e.g., template, etc.) retained by the example feature trainer database 160 by the example feature validator 140.

In a continuing session, or in a subsequent session, of the example computing system 105, the example feature validator 140 compares incoming features detected by the example feature detector 130 and extracted by the example feature extractor 135 to the features, or related data, in the example feature trainer database 160 to resolve a characteristic feature (e.g., eyes) to use as a distance measurement baseline for the example distance analyzer 145 of the example computing system 105. Following determination of a distance between the example sensor 125 and a user of the example computing system 105, the example scaler 120 uses this distance in the example scaling generator 150 to determine a corresponding instruction to pass to the example operating system 165 to effect a change in the example display 180 and/or the displayed content.

Alternatively, the example computing system 105 may omit the example feature detector 130, the example feature extractor 135, the example feature validator 140 and the example feature trainer database 160. In such implementations, the sensor 125 outputs sensed data to the example distance analyzer 145, which is to determine a distance between the example sensor 125 and an object (i.e., a user) in the field of view of the example sensor 125.

The example scaling generator 150 determines a display mode to apply, via the operating system 165 and/or application software 170, in view of the distance value output by the example distance analyzer 145 and corresponding display mode for such distance borne in the scaling database 155. As a user's distance to the example display 180 changes from a first range of distances associated with a first display mode to a second range of distances associated with a second display mode, the display mode is automatically adjusted from the first display mode to the second display mode reflecting a different combination of a display device setting and/or an application software setting.

In some examples, the display mode adjustment(s) is a user-selectable feature wherein the user specifies (e.g., by training, by selection of selectable options, etc.) for the example computing system 105 the user's particular preferences in display mode adjustment(s) (e.g., a scaling to be applied to the display 180 and/or the displayed content, etc.) for a specified distance or range of distances from the display. The defined user display mode adjustment(s) are stored in the example scaling database 155. The output of the example scaling generator 150 and the corresponding values from the example scaling database 155 are used by the example scaler 120 to define instructions to be provided to the example operating system 165 and/or application software 170 to correspondingly apply the appropriate user display mode adjustment(s) to effect the desired display mode and corresponding adjustment of the example display 180 and/or the expression of the displayed content.

The example display 180 is a conventional, high-definition pixel-based display, such as a liquid-crystal display (LCD), light-emitting diode (LED) display, organic light-emitting diode (OLED) display, or plasma display panel (PDP), supporting at least one non-native display resolution and preferably a plurality of non-native display resolutions. In some examples, the example display 180 is a 2K display, a 4K display, or an 8K display.

While an example manner of implementing the teachings herein, as set forth by way of example in FIGS. 2(a)-9 is illustrated in FIG. 1, one or more of the elements, processes and/or devices illustrated in FIG. 1 may be combined, divided, re-arranged, omitted, eliminated and/or implemented in any other way. Further, the example scaler 120, the example feature detector 130, the example feature extractor 135, the example feature validator 140, the example distance analyzer 145, the example scaling generator 150, the example scaling database 155, and the example feature trainer database 160 of FIG. 1 may be implemented by hardware, software, firmware and/or any combination of hardware, software and/or firmware. Thus, for example, the example scaler 120, the example feature detector 130, the example feature extractor 135, the example feature validator 140, the example distance analyzer 145, the example scaling generator 150, the example scaling database 155, and the example feature trainer database 160 of FIG. 1, or other examples expressly or implicitly disclosed herein could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example scaler 120, the example feature detector 130, the example feature extractor 135, the example feature validator 140, the example distance analyzer 145, the example scaling generator 150, the example scaling database 155, and the example feature trainer database 160 illustrated herein are hereby expressly defined to include a tangible computer readable storage device or storage disk such as a memory, a digital versatile disk (DVD), a compact disk (CD), a Blu-ray disk, etc. storing the software and/or firmware. Further still, the example scaler 120, the example feature detector 130, the example feature extractor 135, the example feature validator 140, the example distance analyzer 145, the example scaling generator 150, the example scaling database 155, and the example feature trainer database 160 of FIG. 1 may include one or more elements, processes and/or devices in addition to, or instead of, those illustrated in FIG. 1, and/or may include more than one of any or all of the illustrated elements, processes and devices.

Figure 2A:
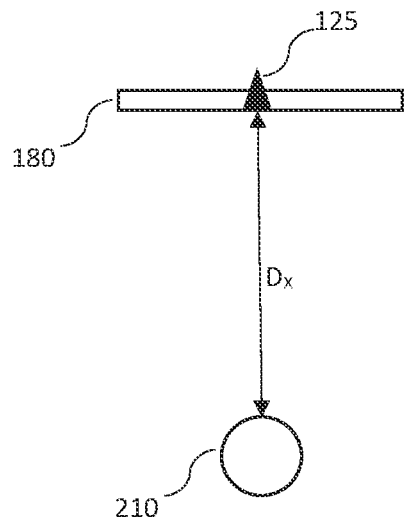
FIGS. 2*a*-2*b* show representations of spatial relations between a user of a system and components of an example system in accordance with teachings of this disclosure.
Figure 2B:
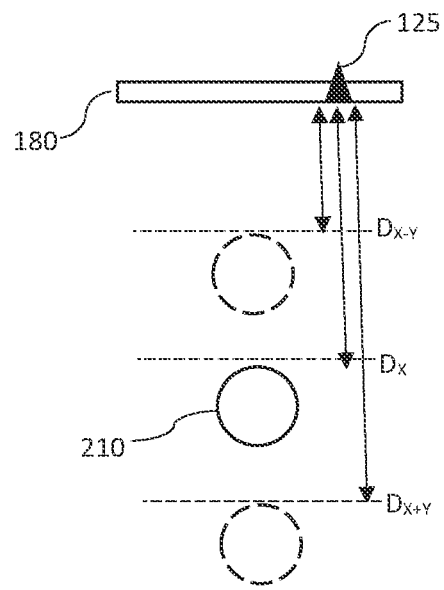

FIG. 2a shows a representation of a user 210 positioned at a distance $D_X$ from an example display 180 and sensor 125. In FIGS. 2a-2b, the distance $D_X$ corresponds to an example default user position or example default viewing position such as a user's normal seated position in a chair relative to the display. At this example default position, the operating system 165 of FIG. 1, and other systems software as may be applicable, is set by the user to a default display mode, the default display mode being a combination of the settings of resolution (width and height), orientation (rotation), bit count (color system) and frequency (refresh rate). In one example, the default display mode corresponds to the recommended settings for the display, as supported by the operating system 165 and computing system 105. Similarly, at this example default position, the application software 170 of FIG. 1 is set, by the user, to a default font size, magnification, etc.

FIG. 2b shows a representation of a movement of the user 210 closer to the example display 180 (i.e., a distance of $D_{X-Y}$) and further from the example display 180 (i.e., a distance of $D_{X+Y}$), where Y is an arbitrarily selected distance that could represent any incremental distance (e.g., 1," 2," 3," 4," 6," 12," 24," 36," etc.). In one example, the incremental distance is user-selectable. In another example, the incremental distance moving closer to the example display 180 differs from the incremental distance moving further from the example display 180. Thus, there are defined at least two ranges of positions relative to the display device (e.g., a first range between $D_X$ and $D_{X-Y}$, a second range between $D_X$ and $D_{X+Y}$, etc.), within which different display characteristics are dynamically expressed. The ranges of positions selectable by the user can be as granulated as desired by the user. For example, a first user (User 1) selects 3 ranges, a first range between $D_X$ and $D_{X-Y}$ in which a first display mode is implemented, a second range between $D_X$ and $D_{X+Y}$ in which a second display mode is implemented and a third range between $D_{X+Y}$ and $D_{X+2Y}$ in which a third display mode is implemented, wherein the datum distance $D_X$ is 24" from the display and the increment Y is uniformly 4." A second user (User 2) may select 4 ranges, a first range between $D_{X-Y}$ and $D_{X-2Y}$ in which a first display mode is implemented, a second range between $D_X$ and $D_{X-Y}$ in which a second display mode is implemented, a third range between $D_X$ and $D_{X+Y}$ in which a third display mode is implemented, and a fourth range between $D_{X+Z}$ and $D_{X+2Z}$ in which a fourth display mode is implemented, wherein the datum distance $D_X$ for User 2 is 30" from the display, the increment Y is 3" and the increment Z is 5." As noted above, changes to a display mode may include, by way of example, a change to an operating system setting (e.g., a display resolution, a display bit rate, a display contrast, a display sharpness, etc.) and/or an application setting (e.g., adjustments to one or more application software graphical element(s), navigation element(s), text, image(s), font(s), etc.), via the scaler 120, to thereby adjust a size of at least one object displayed by the display based on the viewing distance from the display. This change, or these changes, are advantageously user-selectable to enable the user to individualize the change(s) to the user's own preferences and visual capabilities to tailor a dynamic altering of an appearance of the display (e.g., altering a size of at least some displayed content, altering a resolution setting of the display, etc.) to the user to implement an individualized response to positional excursions of the user closer to, or further from, the display device. For example, a user may select an option for an alteration of a display device resolution wherein, as the user moves off of a predetermined range of positions from the display (e.g., 22"-30"), a resolution of the display is increased (e.g., for movement of the user toward the display closer than 22") and decreased (e.g., for movement of the user away from the display beyond 30").

Figure 3A:
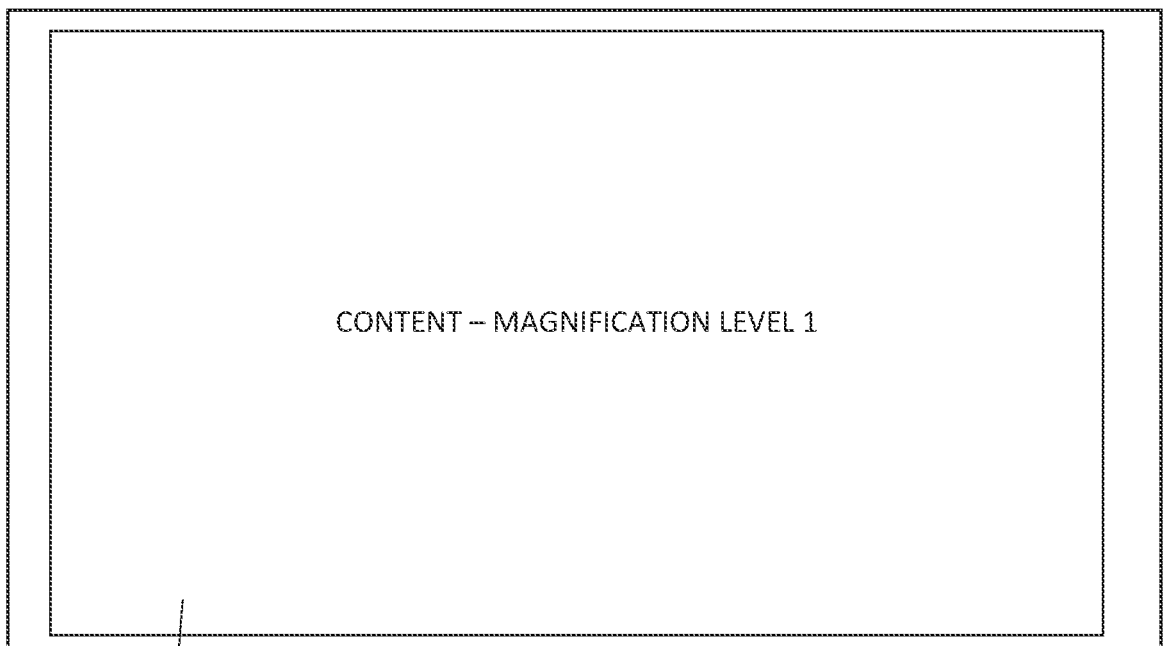
FIGS. 3*a*-3*b* are representations of a first example modification to an example display responsive to a change in a spatial relation between an example system in accordance with teachings of this disclosure and a user of such system.
Figure 3B:
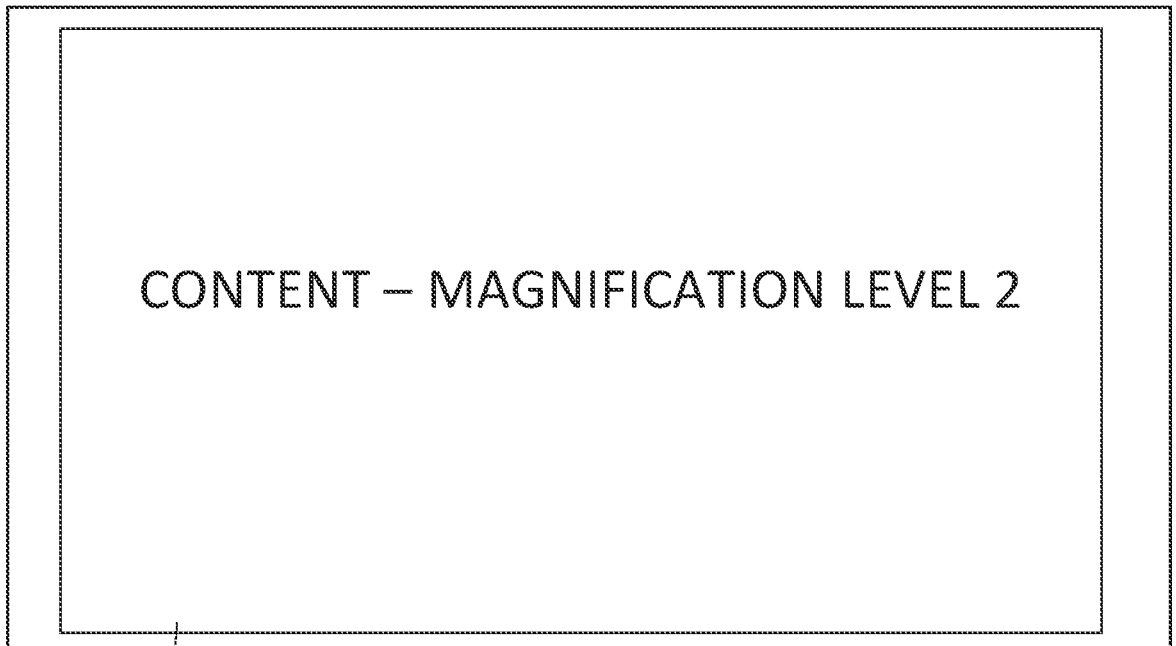

FIGS. 3a-3b represent an example wherein the computing system 105 is set to adjust a size (e.g., a magnification level) of content in an active window or display 310a of the display device 180 from a first size (e.g., magnification level 1), shown in FIG. 3a, to a second size (e.g., magnification level 2), shown in FIG. 3b, responsive to a movement of a user away from the display device 180 from a first position relative to the display device 180 to a second position relative to the display device 180, wherein the second position is further from the display device 180 than the first position. Correspondingly, in this example, the computing system 105 is set to adjust a size (e.g., a magnification level) of content in an active window or display 310a of the display device 180 from a second size (e.g., magnification level 2), shown in FIG. 3b, to a first size (e.g., magnification level 1), shown in FIG. 3a, responsive to a movement of a user toward the display device 180 from a second position relative to the display device 180 to a first position relative to the display device 180, wherein the second position is further from the display device 180 than the first position.

By way of example, the change to the display device 180 setting via the scaler 120, such as is shown in FIGS. 3a-3b, is achieved programmatically by a software call to the application programming interface (API) and/or graphic driver layer for a respective feature of the application software 170 and/or operating system 165. For example, in Microsoft® Windows®, display settings may be changed via an API. In one example, a function ChangeDisplaySettings( )Function resides in user32.dll and is accessed to retrieved one of the modes supported by a graphics device. This function accepts an argument of 1pDevMode, a reference (In/Out) argument of the type DEVMODE that represents the new settings (mode) that will be applied to the display device. After retrieving the current settings (e.g., using a EnumDisplaySettings( ) function), the desired elements of the DEVMODE object are changed to the new setting via the ChangeDisplaySettings( )Function. When the display mode is changed dynamically, the WM_DISPLAY-CHANGE message or the like is sent to all running applications with the new parameters (e.g., new pixel height, new pixel width, new bits per pixel).

In another example, a display resolution or other display setting (e.g., color, etc.) can be effected programmatically via Microsoft® DirectX® graphics ("DirectX"). The APIs provided via DirectX accesses the display settings_dxjDirectDrawClass that resides in a Runtime Callable Wrapper (RCW) assembly or Interop Assembly acting as a proxy to the COM component in the dx3j.dll (Direct 1.0 Type Library) residing in the System32 folder. The getDisplayMode( ) function is used to retrieve current display mode information, inclusive of the resolution. The new parameter settings from the scaler 120 are provided to the SetDisplayMode( ) function. These settings would remain in effect until another change is implemented or until the application is closed, at which point the display setting(s) would revert to the original setting(s).

In still another example, the dynamic modification of a size of content in an active window or display 310a of the display device 180 from a first size (FIG. 3a) to a second size (FIG. 3b), and vice versa, responsive to a movement of a user from a first position relative to the display device 180 to a second position relative to the display device 180, and vice versa, is achieved by using a distance output by the scaler 120 distance analyzer 145 as an input to one or more Microsoft® Direct Manipulation APIs to correspondingly zoom in and out with respect to an active window (e.g., 310 in FIGS. 3a-3b), which may be minimized, maximized, or in an intermediary state. The active window is associated with distance inputs obtained via sensor 125 through an API call, whereupon Direct Manipulation APIs (e.g., the Magnification API, supported by Magnification.dll, etc.) process the input and generate output transforms (e.g., use of a fullscreen magnifier to alter a magnification factor of the displayed content).

Figure 4A:
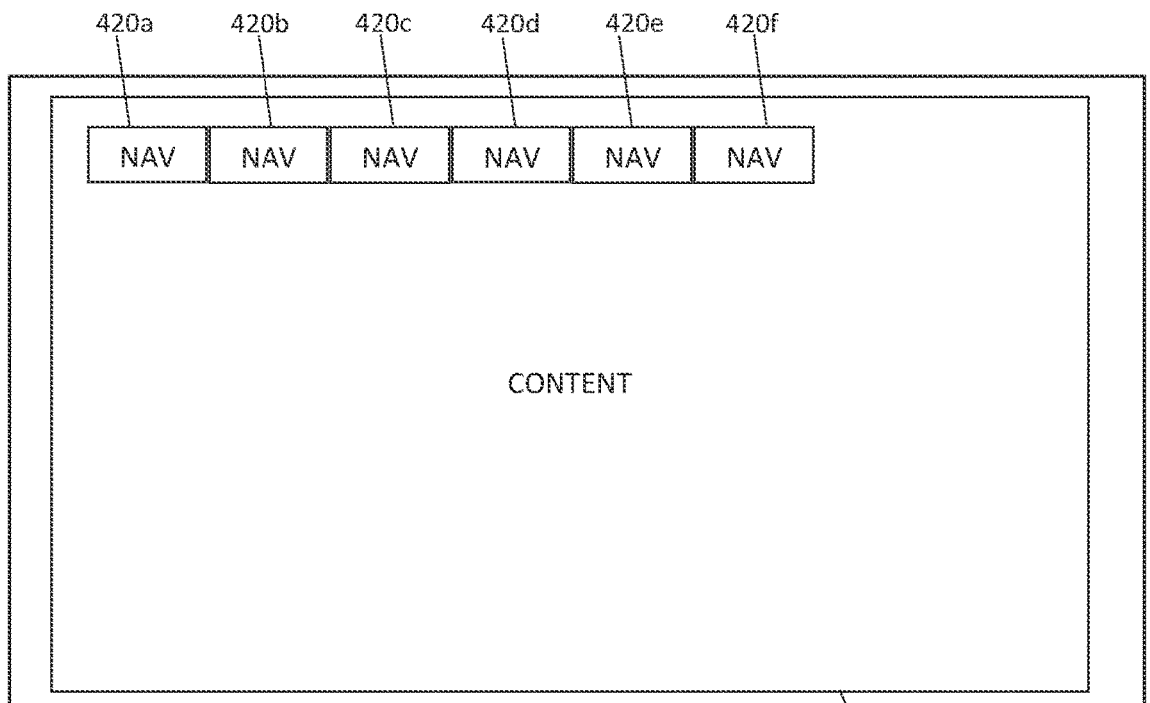
FIGS. 4*a*-4*b* are representations of a second example modification to an example display responsive to a change in a spatial relation between an example system in accordance with teachings of this disclosure and a user of such system.
Figure 4B:
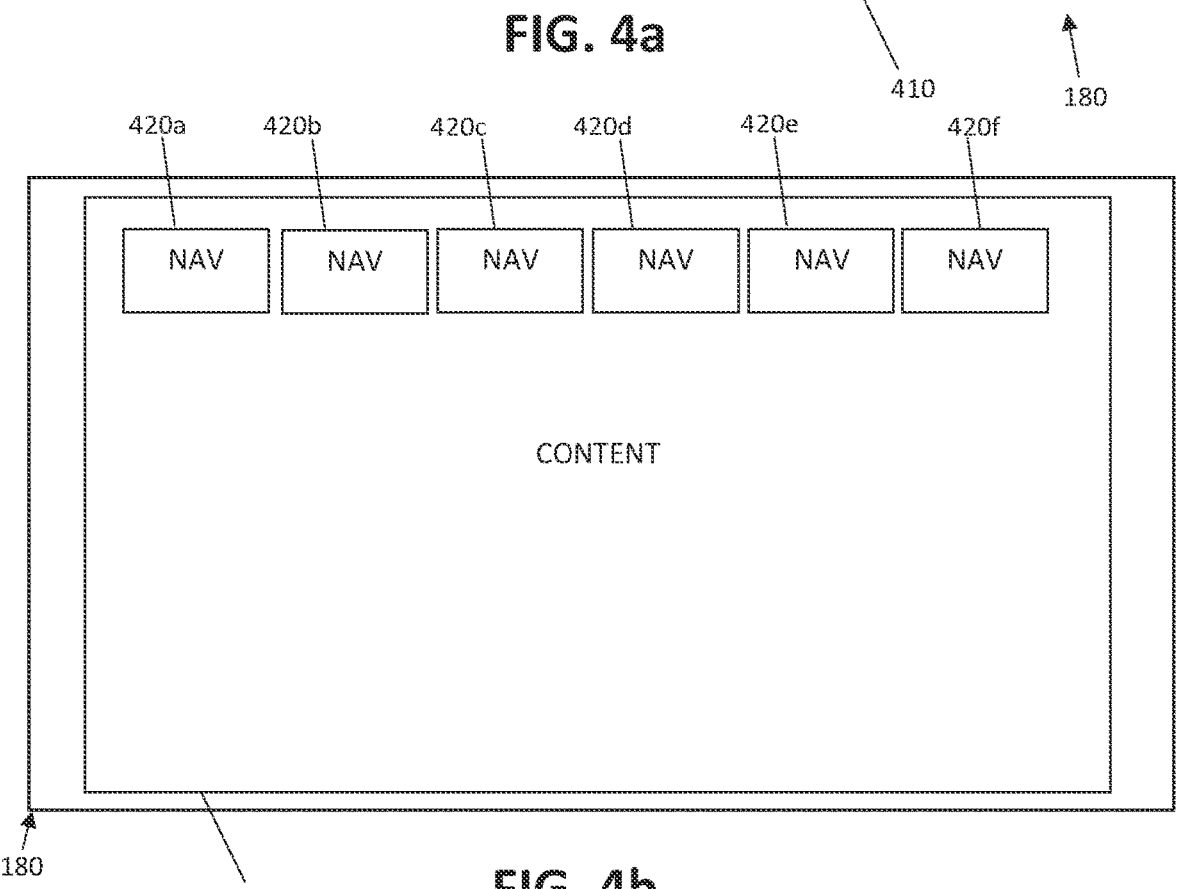

FIGS. 4a-4b represent an example wherein the computing system 105 is set to adjust a magnification level of navigation elements 420a-420f displayed on a display (active window) 410 of the display device 180 from a first magnification level 1 (FIG. 4a) to a second magnification level 2 (FIG. 4b) responsive to a movement of a user away from the display device 180 from a first position relative to the display device 180 to a second position relative to the display device 180, wherein the second position is further from the display device 180 than the first position. Accordingly, as the user moves away from the display device 180, and the user's ability to read the text of the navigation elements 420a-420f would otherwise decrease, the application software 170 and/or operating system 165 is adjusted to cause the display 410 to increase the size of the navigation elements 420a-420f to a degree that enables the user to discern and appropriately use the navigation elements 420a-420f.

Figure 5A:
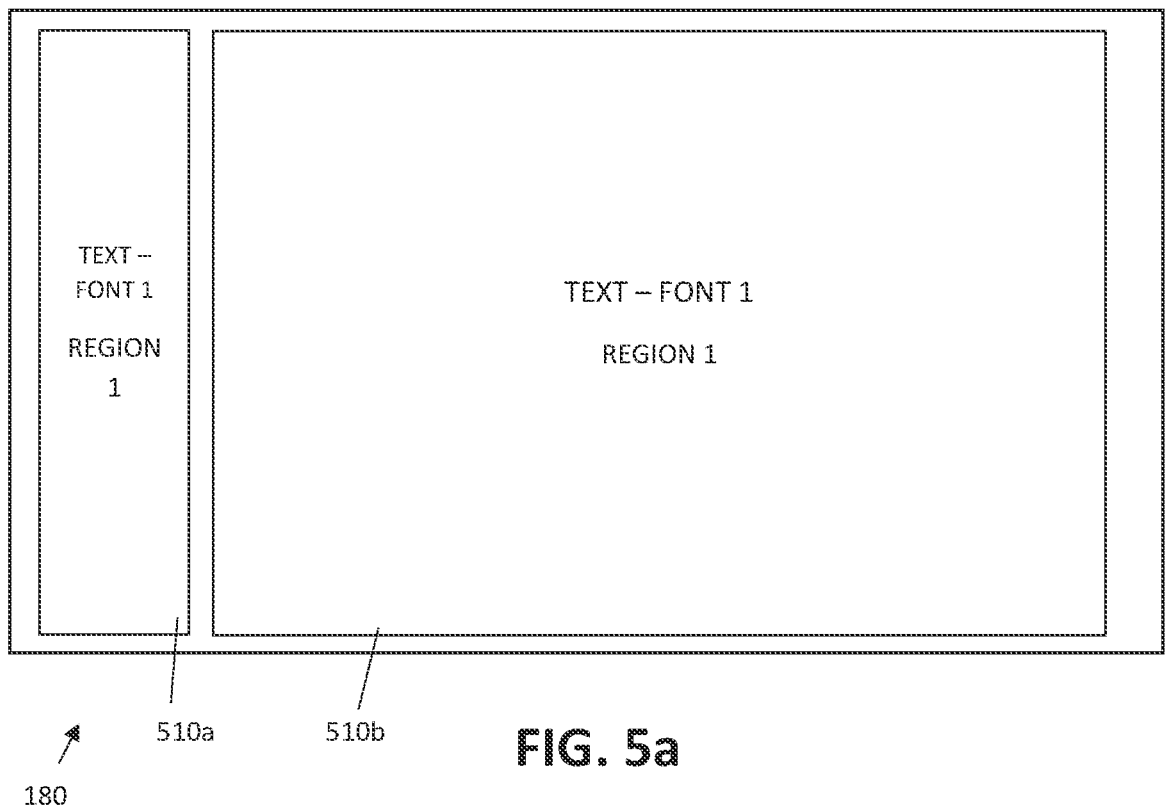
FIGS. 5*a*-5*b* are representations of a third example modification to an example display responsive to a change in a spatial relation between an example system in accordance with teachings of this disclosure and a user of such system.
Figure 5B:
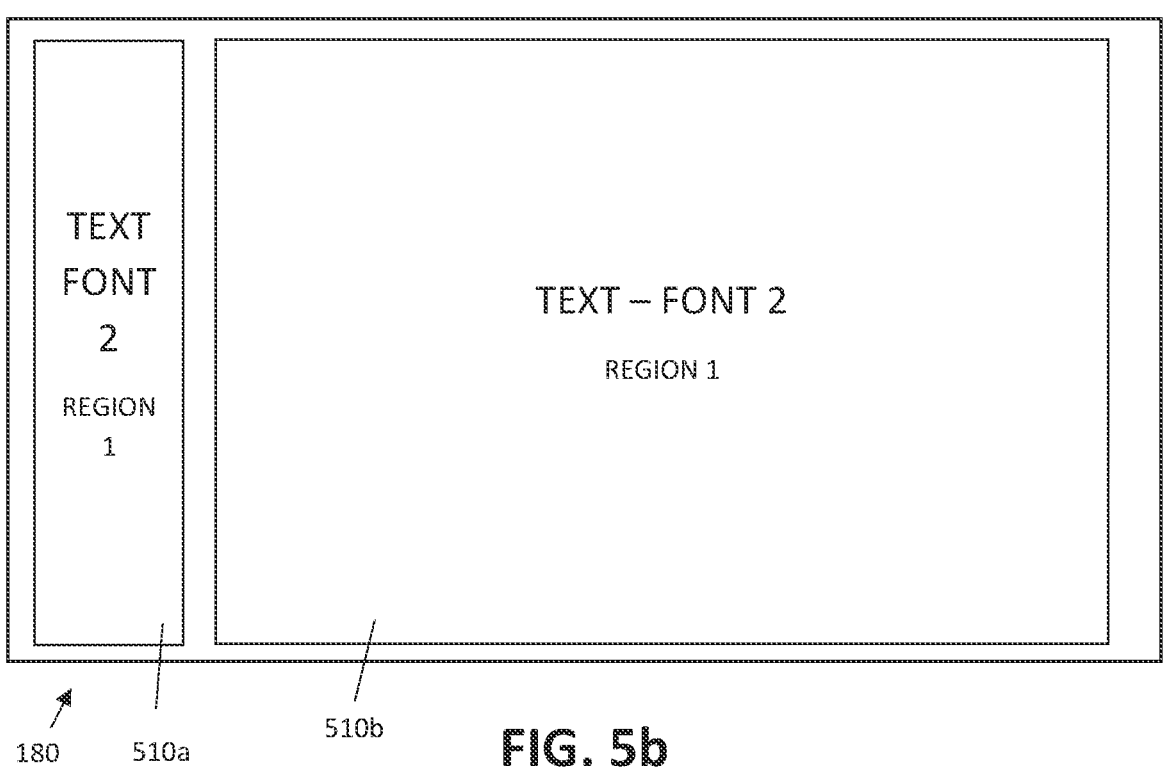

FIGS. 5a-5b represent an example wherein the computing system 105 is set to adjust a size of text font (e.g., font size) displayed on a first region (Region 1) 510a and a second region (Region 2) 510b of the display 410 of the display device 180 from a first size (Text—Font 1) (FIG. 5a) to a second size (Text—Font 2) (FIG. 5b) responsive to a movement of a user away from the display device 180 from a first position relative to the display device 180 to a second position relative to the display device 180, wherein the second position is further from the display device 180 than the first position. Accordingly, as the user moves away from the display device 180, and the user's ability to read the text at the initial setting of "Text—Font 1" (FIG. 5a) would otherwise decrease, the application software 170 and/or operating system 165 is adjusted to cause the display 510 to increase the size of the text to a degree (e.g., from "Text—Font 1" to "Text—Font 2") that enables the user to discern and appropriately read the text at the increased distance from the display device 180.

Figure 6A:
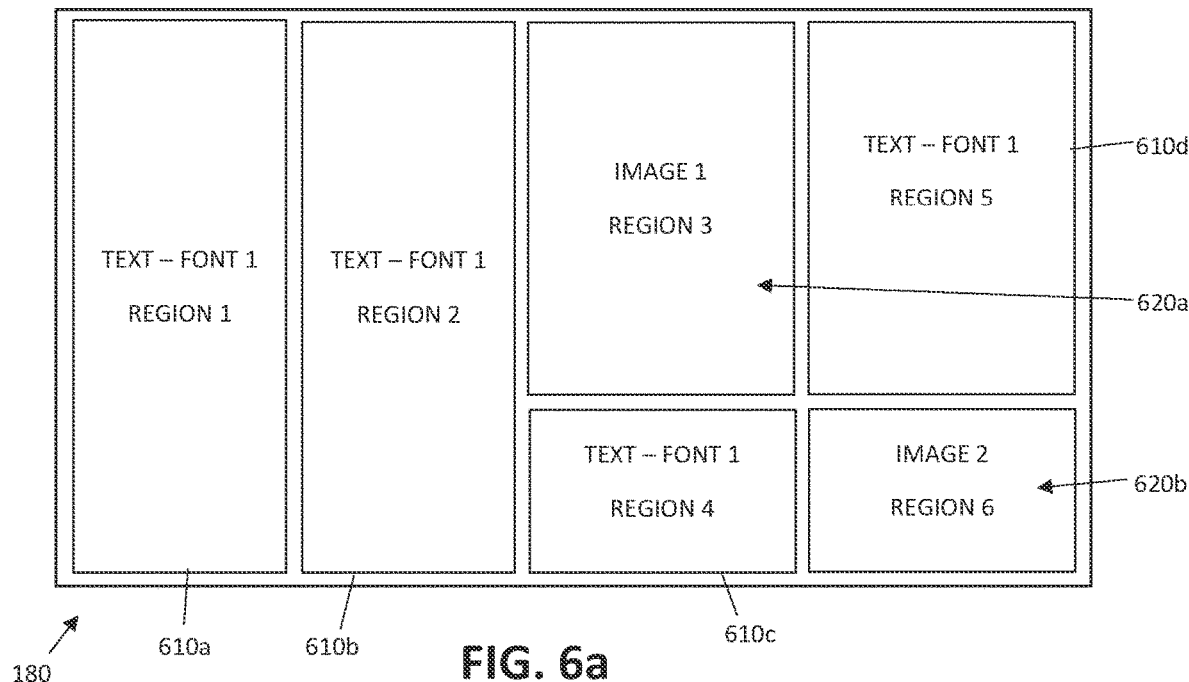
FIGS. 6*a*-6*c* are representations of a fourth example modification to an example display responsive to a change in a spatial relation between an example system in accordance with teachings of this disclosure and a user of such system.
Figure 6B:
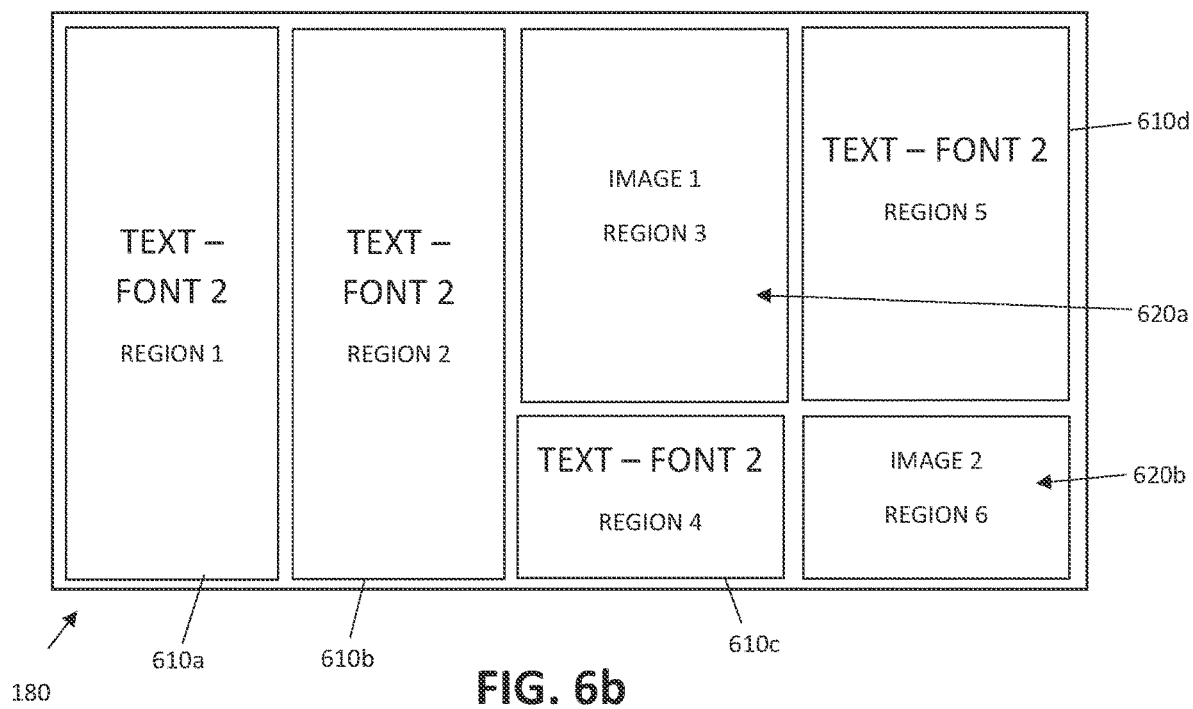
Figure 6C:
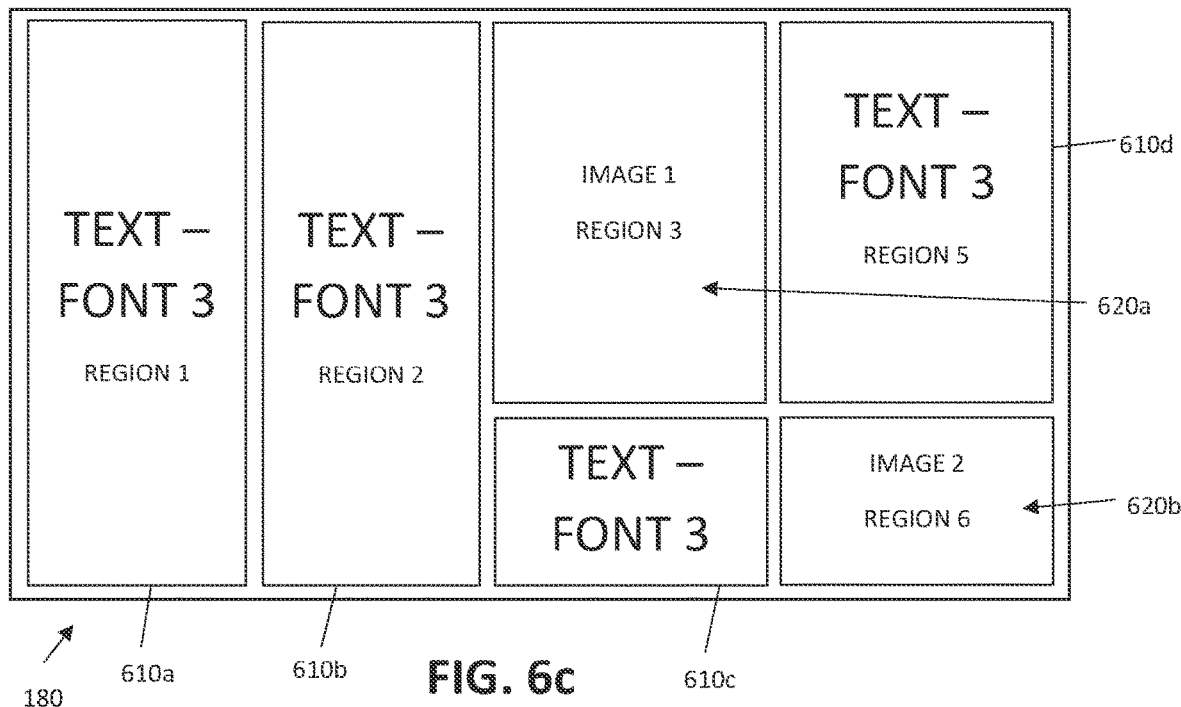

FIGS. 6a-6c represent an example wherein the computing system 105 is set to adjust a size of text (e.g., font size) displayed on a first and second region (Regions 1-2) 610a-610b and a fourth and fifth region (Regions 4-5) 610c-610d of the display device 180, but does not adjust a size of the image ("Image 1") 620a in Region 3 or of the image ("Image 2") 620b in Region 6, via a software call from the scaler 120 to the application programming interface (API) and/or graphic driver layer for a respective feature of the application software 170. In FIG. 6a, a first text size (Text—Font 1) is depicted corresponding to a default or datum position (e.g., 26"), or range of positions (e.g., a user-selected range of 24"-28") of a user from the display device 180. In this example, the size of the text changes from a first size (Text—Font 2) (FIG. 6a) to a second text size (Text—Font 2) (FIG. 6b) responsive to a movement of a user away from the display device 180 from a first position, or first range of positions, relative to the display device 180 to a second position, or into a second range of positions, relative to the display device 180, wherein the second position, or second range of positions, is further from the display device 180 than the first position or first range of positions. Accordingly, as the user moves away from the display device 180, and the user's ability to read the text at the initial setting of "Text—Font 1" (FIG. 6a) would otherwise decrease, the application software 170 and/or operating system 165 is adjusted to cause the display regions 610a-610b and 610c-610d to increase the size of the text to a degree (e.g., from "Text—Font 1" to "Text—Font 2") that enables the user to discern and appropriately read the text at the increased distance from the display device 180. In this example, a size of the image in Region 3 620a of the display device 180 and in Region 6 620b of the display device 180 is not increased.

In FIG. 6c, the size of the text changes from the second size (Text—Font 2) (FIG. 6b) to a third text size (Text—Font 3) responsive to a further movement of a user away from the display device 180 from the second position, or second range of positions, relative to the display device 180 to a third position, or into a third range of positions, relative to the display device 180, wherein the third position, or third range of positions, is further from the display device 180 than the second position or second range of positions. Accordingly, as the user moves further away from the display device 180 than the position(s) represented in FIG. 6b, and the user's ability to read the text at the initial setting of "Text—Font 2" (FIG. 6b) would otherwise decrease, the application software 170 and/or operating system 165 is adjusted to cause the display regions 610a-610b and 610c-610d to increase the size of the text to a degree (e.g., from "Text—Font 2" to "Text—Font 3") that enables the user to discern and appropriately read the text at the increased distance from the display device 180. In this example, a size of the image in Region 3 620a of the display device 180 and in Region 6 620b of the display device 180 is not increased.

Figure 7A:
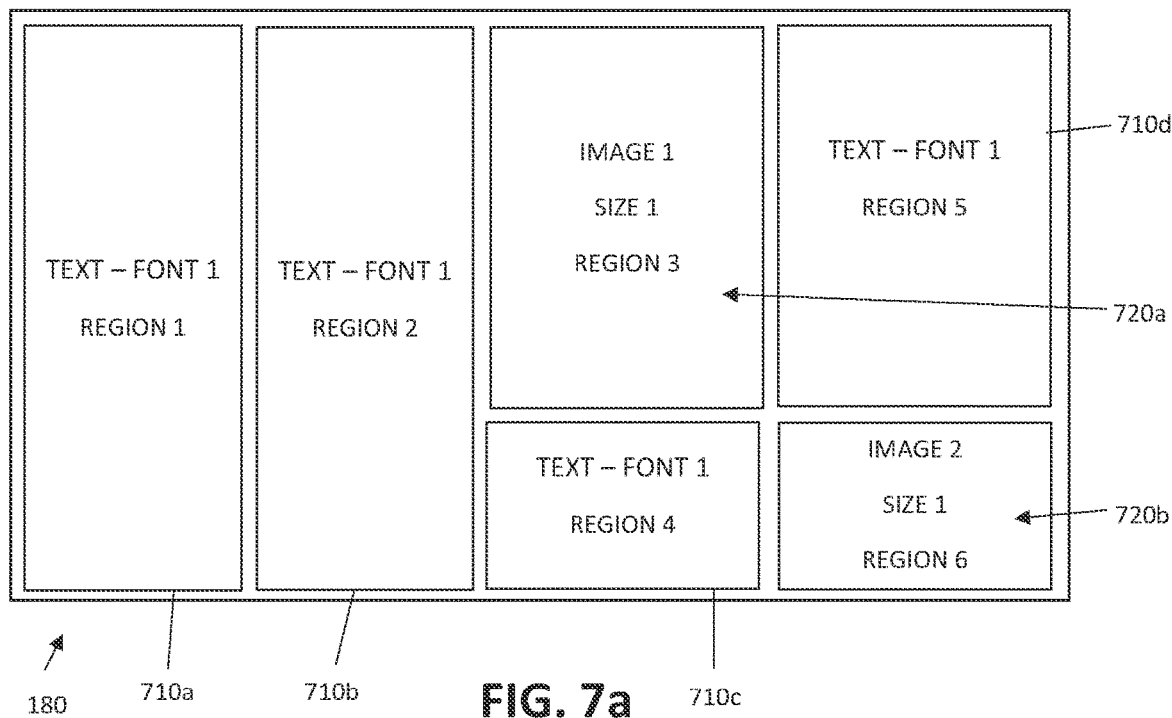
FIGS. 7*a*-7*c* are representations of a fifth example modification to an example display responsive to a change in a spatial relation between an example system in accordance with teachings of this disclosure and a user of such system.
Figure 7B:
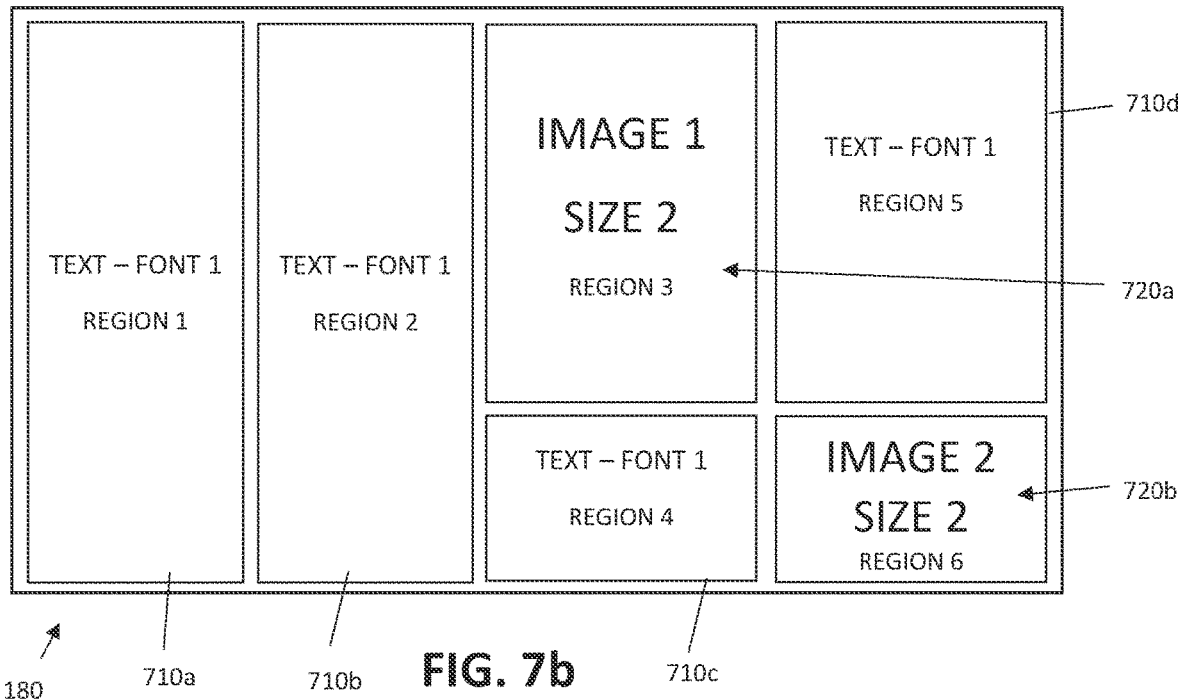
Figure 7C:
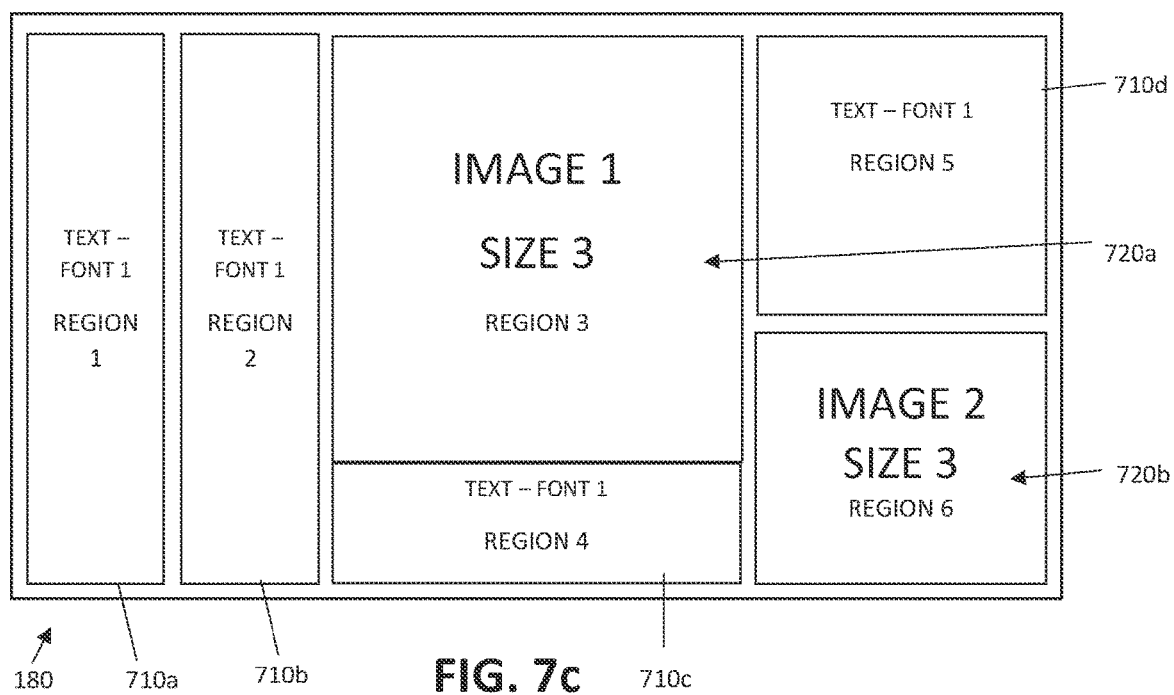

FIGS. 7a-7c represent an example wherein the computing system 105 is set to adjust a size of images displayed on Region 3 720a and Region 6 720b of the display device 180 responsive to movement of a user relative to the display device 180, while maintaining a text size of text in the first and second region (Regions 1-2) 710a-710b and a fourth and fifth region (Regions 4-5) 710c-710d of the display device 180. In this example, these adjustments are via a software call from the scaler 120 to the application programming interface (API) and/or graphic driver layer for a respective feature of the application software 170. In FIG. 7a, a first text size (e.g., "Text—Font 1") and first image size (e.g., "Image 1—Size 1") are depicted corresponding to a default or datum position (e.g., 20"), or range of positions (e.g., a user-selected range of 18"-22") of a user from the display device 180. In this example, the size of the images changes from a first size (e.g., "Image 1—Size 1") (FIG. 7a) to a second size (e.g., "Image 1—Size 2") (FIG. 7b) responsive to a movement of a user away from the display device 180 from a first position, or first range of positions, relative to the display device 180 to a second position, or into a second range of positions, relative to the display device 180, wherein the second position, or second range of positions, is further from the display device 180 than the first position or first range of positions. Accordingly, as the user moves away from the display device 180, the size of the images increase to a degree that enables the user to better discern the image at the increased distance from the display device 180. In this example, a size of the text in Regions 1-2 710a, 710b of the display device 180 and in Regions 4-5 710c-710d of the display device 180 is not increased.

In FIG. 7c, the computing system 105 is set to further adjust a size of images displayed on Region 3 720a and Region 6 720b of the display device 180, via a software call from the scaler 120 to the application programming interface (API) and/or graphic driver layer for a respective feature of the application software 170, responsive to movement of a user relative to the display device 180. In this example, the computing system 105 maintains a text size of text in the first and second region (Regions 1-2) 710a-710b and a fourth and fifth region (Regions 4-5) 710c-710d of the display device 180 during movement of a user relative to the display device 180. In FIG. 7c, the size of the images changes from the second size (e.g., "Image 1—Size 2") (FIG. 7b) to a third size (e.g., "Image 1—Size 3") (FIG. 7c) responsive to a movement of a user away from the display device 180 from the second position, or second range of positions, relative to the display device 180 to a third position, or into a third range of positions, relative to the display device 180, wherein the third position, or third range of positions, is further from the display device 180 than the second position or second range of positions. Accordingly, as the user moves away from the display device 180, the size of the images further increases to a degree that enables the user to better discern the image at the increased distance from the display device 180. In this example, a size of the text in Regions 1-2 710a, 710b of the display device 180 and in Regions 4-5 710c-710d of the display device 180 is not increased.

In the examples of FIGS. 6a-6c and FIGS. 7a-7c, the application software 170 advantageously utilizes one or more APIs to segment or catalog different objects (e.g., text, document, picture, video, etc.) and let the API individually control a size of these objects, such as by defining a plurality of source rectangles for magnification windows via Microsoft® Windows® MagSetWindowSource function, or the like, individually or as a combination of two or more objects. In one example, a user trains the computing system 105 as to the user's preferences for scaling one or more objects responsive to a user's positional changes relative to the display device 180, as shown in the examples of FIGS. 6a-6c and FIGS. 7a-7c. These user preferences may be application-specific or may be applied across a plurality of applications. In another example, rather than an explicit training of the computer system 105 by the user, the computer system 105 itself stores user inputs during interaction with the operating system 165 and application software 170 and, based on the user history, automatically selects the adjustments to the active window(s), or portions thereof, responsive to the user history.

Figure 8:
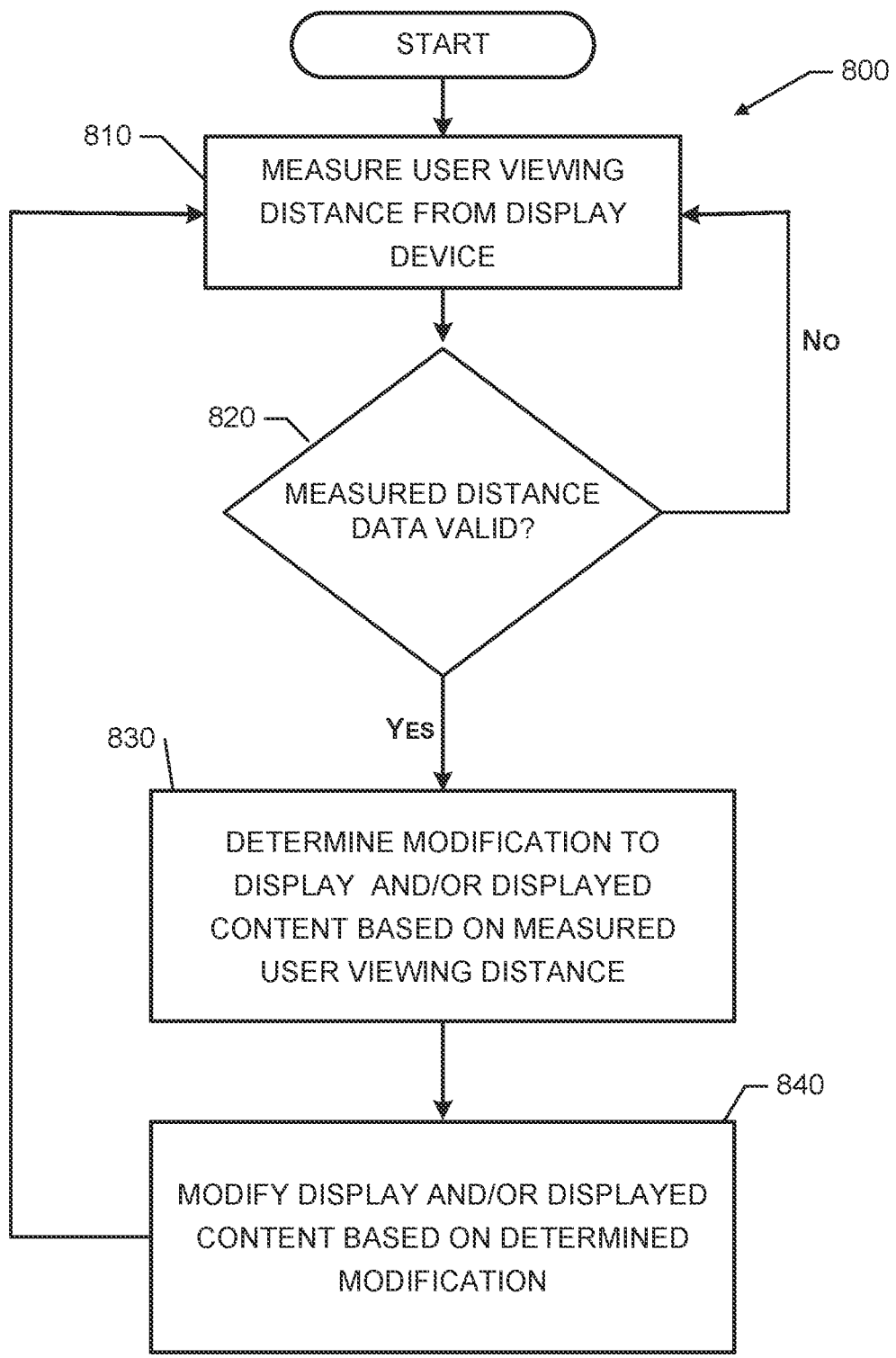
FIG. 8 shows a flowchart, which may be implemented using computer-executable instructions, in accordance with teachings of this disclosure.
Figure 9:
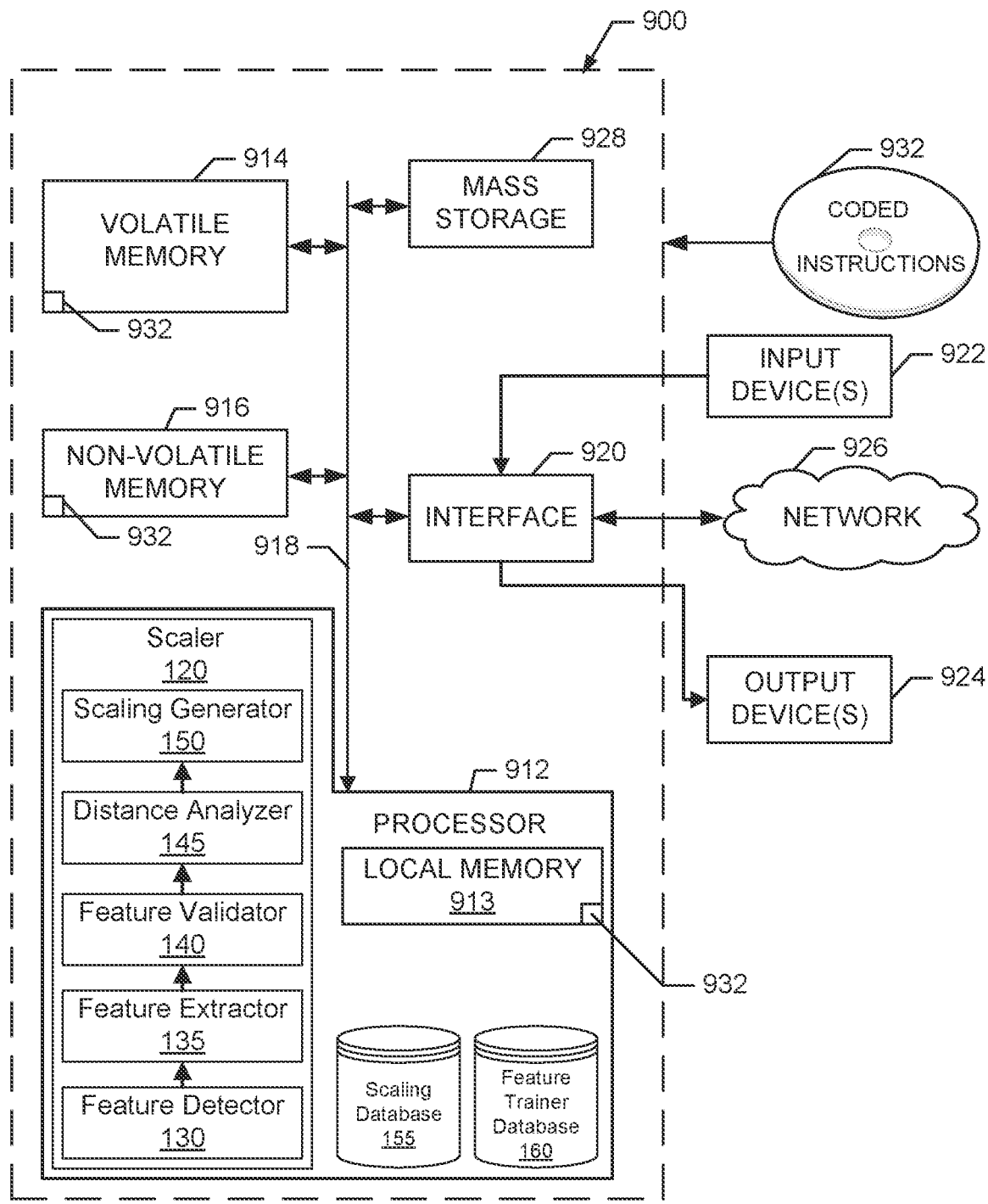
FIG. 9 is a block diagram of an example processor platform which may execute the example instructions, such as instructions implementing the process shown in the flowchart in FIG. 8, to implement concepts disclosed herein.

A flowchart representative of example machine readable instructions for implementing the computing system 105 of FIG. 1 is shown in FIG. 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example computing system 105 may alternatively be used. For example, the order of execution of the blocks may be changed, and/or some of the blocks described may be changed, eliminated, or combined.

As mentioned above, the example process of FIG. 8, or other processes disclosed herein, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 8, or other processes disclosed herein, may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to the figures, FIG. 8 is a flowchart representative of example machine-readable instructions 800 that may be executed to implement the example computing system 105 and the example scaler 120 of FIG. 1. The example program of FIG. 8 begins at block 810 where the example scaler 120 measures the user viewing distance from the display device, such as via the sensor 125, feature detector 130, feature extractor 135, feature validator 140 and distance analyzer 145. In one example, the viewing distance is representative of a distance between the display device 170 and a user's eyes, which may include an actual measurement of a distance between the display device 170 and a user's eyes or a measurement of a distance between the display device 170 and a facial landmark or other body part correlated to a distance between the display device 170 user's eyes. As noted above, the sensor 125 may include, for example, a camera, an infrared camera, an infrared laser projector, a range camera (e.g., a stereo camera or a time-of-flight camera), and/or an ultrasonic sensor.

At block 820, the scaler 120 determines whether the measured distance data is valid. In one example, the scaler 120 continuously, or intermittently, processes distance measurement data representative of a viewing distance and uses a plurality of distance measurements performed within a predetermined period of time as an input to the scaling generator. By way of example, a plurality of measurements are performed via on or more sensors 125 and an average is taken and/or outliers removed to remove invalid data (e.g., movement of a user's head out of the focal path of the sensor 125 during the sampling interval, etc.). In at least some examples, inertial factors or delays are applied by the scaler 120 to gradually transition from a first state to a second state responsive to a user's movement relative to the display device 170.

In block 830, the scaler 120 determines a modification to the display device 170 and/or the displayed content, using the scaling database 155, based on the measured user viewing distance output by the distance analyzer 145. As noted above, responsive to sensor 125 data representative of a viewing distance between a display and a user of the display device 180, the scaler 120 alters content displayed on a display device 170 and adjusts a size of at least one object displayed by the display based on the viewing distance, wherein in one example the at least one object includes an icon, a navigation element, text, an image, a font, or a combination thereof. In one example, the scaler 120 determines a pixels-per-degree (PPD) value corresponding to the viewing distance and conditions the adjusting of the size of the at least one object on the pixels-per-degree value determined via the scaler. In another example, the determining of the pixels-per-degree value includes determining an average pixels-per-degree value using, of a plurality of distance measurements taken by the sensor 125, distance measurements deemed to be valid measurements.

In an example, the adjusting of the size of at least one object displayed by the display includes using the scaler to alter or adjust a display device setting and/or an application software setting (i.e., a display mode) such as a display resolution (e.g., changing a display resolution from a native display resolution to a non-native display resolution). For example, the altering of the display may include increasing, via the scaler 120, the size of at least one object responsive to an increase in the viewing distance, and decreasing, via the scaler 120, the size of the at least one object responsive to a decrease in the viewing distance. Such at least one object includes, in some examples, at menu, a window, a selectable element, a soft key, an icon, a widget, a graphical control element, a tab, a button, a pointer, and/or a cursor. In one example, this adjusting of the size of the at least one object, via the scaler 120, is performed while maintaining a native display resolution.

As is represented by the examples of FIGS. 3a-7c, the altering of the display may include adjustment of the size of the at least one object, via the scaler 120, by a first adjustment (e.g., a user-selected first adjustment), when the viewing distance is determined by the distance analyzer 145 to be within a first range of distances. This first adjustment may occur with or without adjusting the size of a second object displayed on the display. For example, in FIGS. 4a-4b, a size of a plurality of first objects (e.g., navigation elements 420a-420f) are adjusted to be larger (FIG. 4b) responsive to an increase in the user's viewing distance from the display device 180, whereas a size of a balance of the objects displayed (i.e., "Content") is not altered.

In another example, a size of at least one object is adjusted, via the scaler 120, by a second adjustment, different than the first adjustment, when the viewing distance is within a second range of distances different than a first range of distances for which a first adjustment is applied. In one example, the first range of distances is closer to the display device 170 than a default range of positions and the first adjustment is a decrease in size and the first second range of distances is further from the display device 170 than the default range of positions and the second adjustment is an increase in size. In the example of FIG. 7c, the size of at least one object (e.g., images in Regions 3 and 6) is adjusted, via the scaler 120, by a second adjustment further to the first adjustment represented in FIG. 7b, when the viewing distance is within a second range of distances greater than a first range of distances for which a first adjustment is applied. The adjusting of the size of the at least one object, via the scaler 120, by a second adjustment when the viewing distance is within a second range of distances may occur with or without adjusting the size of a second object displayed on the display (e.g., occurring with an adjustment of navigation elements, or occurring in isolation).

In another example, the scaler 120 increases a display resolution, via the scaler, relative to a native display resolution, in response to a decrease in the viewing distance. In another example, the scaler 120 decreases a display resolution, via the scaler, relative to a native display resolution, in response to an increase in the viewing distance.

Based on the distance between the user and the display device 170 determined by the distance analyzer 145, and the corresponding modification determined to apply by the scaling generator 150 of the scaler 120, Block 840 modifies the display device and/or the displayed content in view of the scaling database 155. In one example, Blocks 810-840 are repeated intermittently at a symmetric or asymmetric interval, or continuously, during a user session on the computing system 105.

As noted above, FIG. 1 is a block diagram of an example processor platform 900 capable of executing the instructions of the program 800 example of FIG. 8. In various aspects, the processor platform 900 is, by way of example, a server, a desktop computer, a laptop computer, a television, a display device, a terminal, a mobile device (e.g., a tablet computer, such as an iPad™), or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912

The processor 912 may execute one or more of the feature detector 130, feature extractor 135, feature validator 140, distance analyzer 145, scaling generator 150, or the entirety of the scaler 120, of FIG. 1. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system. In accordance with examples disclosed herein, such as is shown in FIG. 1, the input device(s) 922 include one or more sensors 108 including, by way of example and without limitation, a camera, an infrared camera, an infrared laser projector, a range camera (e.g., a stereo camera or a time-of-flight camera, etc.), an infrared distance sensor, a laser rangefinder, a passive infrared sensor, an ultrasonic sensor, and/or a combination thereof (e.g., an Intel® RealSense™ camera comprising a HD camera, an infrared camera, and an infrared laser projector, etc.).

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 132 represented generally in FIG. 8, or in any other methods and processes disclosed herein, may be stored in the mass storage device 928, in the volatile memory 914, in the non-volatile memory 916, and/or on a removable tangible computer readable storage medium such as a CD or DVD.

Example 1 is a computing system including a sensor to collect data representative of a viewing distance between a display and a user of the display and a scaler to adjust a size of at least one object displayed by the display based on the viewing distance from the display. Example 1 may include a memory.

Example 2 includes the computing system as defined in Example 1 and further includes a display.

Example 3 includes the computing system as defined in Example 2, wherein the at least one object includes a graphical element, a navigation element, text, an image, a font, or a combination thereof.

Example 4 includes the computing system as defined in Example 3, wherein the sensor includes at least one of a camera, an infrared camera, an infrared laser projector, a range camera, an infrared distance sensor, a laser rangefinder, an infrared sensor, or a combination thereof.

Example 5 includes the computing system as defined in Example 4, wherein the range camera includes a stereo camera or a time-of-flight camera.

Example 6 includes the computing system as defined in Example 3, wherein the sensor includes an ultrasonic sensor.

Example 7 includes the computing system as defined in Example 3, wherein the scaler is to increase the size of the at least one object responsive to an increase in the viewing distance and to decrease the size of the at least one object responsive to a decrease in the viewing distance.

Example 8 includes the computing system as defined in Example 3, wherein the navigation element includes at least one of a menu, a window, a selectable element, a soft key, an icon, a widget, a graphical control element, a tab, a button, a pointer, or a cursor.

Example 9 includes the computing system as defined in Example 3, wherein the scaler is to alter a display mode to increase a display resolution, relative to a native display resolution, responsive to a decrease in the viewing distance and to decrease the display resolution responsive to an increase in the viewing distance.

Example 10 includes the computing system as defined in Example 3, wherein the scaler is to adjust the size of the at least one object while maintaining a native display resolution.

Example 11 includes the computing system as defined in Example 3, wherein the sensor is to collect data representative of a facial landmark or a facial feature of a user.

Example 12 includes the computing system as defined in Example 3, wherein the scaler is to dynamically adjust the size of a first object displayed on the display responsive to changes in viewing distance.

Example 13 includes the computing system as defined in Example 12, wherein the scaler is to adjust the size of the first object displayed on the display, by a first adjustment, when the viewing distance is within a first range of distances.

Example 14 includes the computing system as defined in Example 12, wherein the scaler is to adjust the size of the first object displayed on the display, by a first adjustment and without adjusting the size of a second object displayed on the display, when the viewing distance is within a first range of distances.

Example 15 includes the computing system as defined in Example 13, wherein the first adjustment is a decrease in size.

Example 16 includes the computing system as defined in Example 13, wherein the scaler is to adjust the size of a first object displayed on the display, by a second adjustment, when the viewing distance is within a second range of distances, the second range of distances being different from the first range of distances.

Example 17 includes the computing system as defined in Example 16, wherein the scaler is to adjust the size of the first object displayed on the display, by a second adjustment and without adjusting the size of a second object displayed on the display, when the viewing distance is within a second range of distances, the second range of distances being different from the first range of distances.

Example 18 includes the computing system as defined in Example 16, wherein the second adjustment is an increase in size.

Example 19 includes the computing system as defined in Example 16, wherein the scaler is to adjust the size of a first object displayed on the display, by a third adjustment, when the viewing distance is within a third range of distances, the third range of distances being different from the first range of distances and the second range of distances.

Example 20 includes the computing system as defined in Example 17, wherein the scaler is to adjust the size of the first object displayed on the display, by a third adjustment and without adjusting the size of the second object displayed on the display, when the viewing distance is within a third range of distances, the third range of distances being different from the first range of distances and the second range of distances.

Example 21 includes the computing system of claim 19, wherein the third adjustment is an increase in size greater in magnitude than the second adjustment.

Example 22 includes the computing system as defined in Example 18, wherein the scaler is to receive a user-selection of at least one of the first adjustment or the second adjustment.

Example 23 includes the computing system as defined in Example 22, wherein the scaler is to receive a user-selection of at least one of the first range of distances or the second ranges of distances.

Example 24 is a method of altering content displayed on a display including collecting, via a sensor, data representative of a viewing distance between a display and a user of the display and adjusting a size of at least one object displayed by the display, via a scaler, based on the viewing distance, wherein the at least one object includes an icon, a navigation element, text, an image, a font, or a combination thereof.

Example 25 includes the method as defined in Example 24, further including determining, via a scaler, a pixels-per-degree value corresponding to the viewing distance and conditioning the adjusting of the size of the at least one object on the pixels-per-degree value determined via the scaler.

Example 26 includes the method as defined in Example 25, further including wherein the data representative of a viewing distance includes a plurality of distance measurements performed within a predetermined period of time.

Example 27 includes the method as defined in Example 26, wherein the determining of the pixels-per-degree value includes determining an average pixels-per-degree value using valid ones of the plurality of distance measurements.

Example 28 includes the method as defined in Example 24, wherein the adjusting of the size of at least one object displayed by the display includes using the scaler to alter a display mode to adjust a display resolution relative to a native display resolution.

Example 29 includes the method as defined in Example 24, wherein the viewing distance is representative of a distance between the display and a user's eyes.

Example 30 includes the method as defined in Example 24, wherein the sensor includes at least one of a camera, an infrared camera, an infrared laser projector, a range camera, or an ultrasonic sensor.

Example 31 includes the method as defined in Example 30, wherein the range camera includes a stereo camera or a time-of-flight camera.

Example 32 includes the method as defined in Example 24, increasing, via the scaler, the size of the at least one object responsive to an increase in the viewing distance, and decreasing, via the scaler, the size of the at least one object responsive to a decrease in the viewing distance.

Example 33 includes the method as defined in Example 24 wherein the navigation element includes at least one of a menu, a window, a selectable element, a soft key, an icon, a widget, a graphical control element, a tab, a button, a pointer, or a cursor.

Example 34 includes the method as defined in Example 24, including increasing a display resolution, via the scaler, relative to a native display resolution, in response to a decrease in the viewing distance.

Example 35 includes the method as defined in Example 24, including decreasing a display resolution, via the scaler, relative to a native display resolution, in response to an increase in the viewing distance.

Example 36 includes the method as defined in Example 24, including adjusting the size of the at least one object, via the scaler, while maintaining a native display resolution.

Example 37 includes the method as defined in Example 24, including adjusting the size of the at least one object, via the scaler, by a first adjustment, when the viewing distance is within a first range of distances.

Example 38 includes the method as defined in Example 24, including adjusting the size of the at least one object, via the scaler, by a first adjustment, when the viewing distance is within a first range of distances, and without adjusting the size of a second object displayed on the display.

Example 39 includes the method as defined in Example 37, including adjusting the size of the at least one object, via the scaler, by a second adjustment, when the viewing distance is within a second range of distances.

Example 40 includes the method as defined in Example 27, including adjusting the size of the at least one object, via the scaler, by a second adjustment, when the viewing distance is within a second range of distances, and without adjusting the size of a second object displayed on the display.

Example 41 includes the method as defined in Example 39, wherein the first adjustment is a decrease in size and wherein the second adjustment is an increase in size.

Example 42 is at least one machine readable medium including a plurality of instructions that in response to being executed on a computing device, cause the computing device to collect, via a sensor, data representative of a viewing distance between a display and a user of the display; and adjust a size of at least one object displayed by the display, via a scaler, based on the viewing distance, wherein the at least one object includes an icon, a navigation element, text, an image, a font, or a combination thereof.

Example 43 includes the at least one machine readable medium as defined in Example 42, the plurality of instructions, in response to being executed on a computing device, cause the computing device to determine, via the scaler, a validity of the data representative of the viewing distance between a display and a user of the display.

Example 44 is a computing system including a sensor means to collect data representative of a viewing distance between a display and a user of the display and a scaler means to adjust a size of at least one object displayed by the display based on the viewing distance from the display. Example 44 may include a memory.

Example 45 includes the computing system of Example 44 and further includes a display means.

Example 46 includes the computing system of claim 45, wherein the sensor means includes at least one of a camera, an infrared camera, an infrared laser projector, a range camera, an infrared distance sensor, a laser rangefinder, an infrared sensor, or a combination thereof.

Example 47 is an apparatus including scaler logic, at least a portion of which is implemented in hardware, to adjust a size of at least one object displayed by a display based on the viewing distance of a user from the display.

Example 48 includes the apparatus of claim 47 and further includes a sensor to collect data representative of the viewing distance between the display and the user of the display.

Example 49 includes the apparatus of claim 47 and further includes a memory.

Example 50 includes the apparatus of claim 47 and further includes a display.

Example 51 includes the apparatus of claim 47, wherein the scaler is to increase the size of the at least one object responsive to an increase in the viewing distance and to decrease the size of the at least one object responsive to a decrease in the viewing distance.

Example 52 includes the apparatus of claim 47, wherein the scaler is to alter a display mode to increase a display resolution, relative to a native display resolution, responsive to a decrease in the viewing distance and to decrease the display resolution responsive to an increase in the viewing distance.

Example 53 includes the apparatus of claim 47, wherein the scaler is to adjust the size of the at least one object while maintaining a native display resolution.

Example 54 includes the apparatus of claim 47, wherein the scaler is to dynamically adjust the size of the at least one object displayed by the display responsive to changes in viewing distance.

Example 55 includes the apparatus of claim 47, wherein the scaler is to adjust the size of the at least one object displayed by the display, by a first adjustment, when the viewing distance is within a first range of distances.

Example 56 includes the apparatus of claim 55, wherein the scaler is to adjust the size of the at least one object displayed by the display, by a second adjustment, when the viewing distance is within a second range of distances, the second range of distances being different from the first range of distances.

Example 57 includes the apparatus of claim 56, wherein the scaler is to receive a user-selection of at least one of the first adjustment or the second adjustment.

Example 58 includes the apparatus of claim 56, wherein the scaler is to receive a user-selection of at least one of the first range of distances or the second ranges of distances.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system, comprising:
   a display;
   a sensor to output a signal associated with a user feature; and
   scaler instructions to cause adjustment of an operating system setting based on a viewing distance between the display and the user feature.

2. The computing system of claim 1, wherein the user feature is a first feature, and further including feature validator instructions to cause comparison of the first feature to a second feature from a feature trainer database.

3. The computing system of claim 2, wherein, when the first feature matches the second feature, the scaler instructions are to cause adjustment of the operating system setting to adjust a size of at least one of a pointer or a cursor to be displayed by the display.

4. The computing system of claim 1, further including a facial recognition algorithm to store features in a feature trainer database.

5. The computing system of claim 4, wherein the facial recognition algorithm includes a geometric algorithm, a photometric recognition algorithm, a Haar basis function, or a Viola-Jones algorithm.

6. The computing system of claim 1, wherein the user feature includes at least one of an eye, a nose, a head, or a shoulder.

7. The computing system of claim 1, wherein the scaler instructions are to cause dynamic adjustment of the operating system setting to adjust a size of a first object responsive to changes in viewing distance.

8. The computing system of claim 7, wherein the scaler instructions are to cause adjustment of the size of the first object by a first adjustment when the viewing distance is within a first range of distances.

9. The computing system of claim 7, wherein the scaler instructions are to cause adjustment of the size of the first object by a first adjustment without adjusting the size of a second object displayed on the display when the viewing distance is within a first range of distances.

10. The computing system of claim 9, wherein the first adjustment is a decrease in size.

11. The computing system of claim 9, wherein the scaler instructions are to cause adjustment of the size of the first object by a second adjustment when the viewing distance is within a second range of distances, the second range of distances being different from the first range of distances.

12. The computing system of claim 11, wherein the scaler instructions are to cause adjustment of the size of the first object by a third adjustment, when the viewing distance is within a third range of distances, the third range of distances being different from the first range of distances and the second range of distances.

13. The computing system of claim 12, wherein the third adjustment is an increase in size greater in magnitude than the second adjustment.

14. The computing system of claim 13, wherein the scaler instructions are responsive to a user-selection of at least one of the first adjustment or the second adjustment.

15. The computing system of claim 13, wherein the scaler instructions are responsive to a user-selection of at least one of the first range of distances or the second ranges of distances.

16. An apparatus, comprising:
   memory;
   computer readable instructions; and
   processor circuitry to execute the computer readable instructions to at least:
      detect a user feature associated with a user; and
      adjust an operating system setting based on a viewing distance between a display and the user feature.

17. The apparatus of claim 16, wherein the user feature is a first feature, and the processor circuitry is to compare the first feature to a second feature from a feature trainer database.

18. The apparatus of claim 17, wherein the processor circuitry is to adjust the operating system setting to adjust a size of at least one of a pointer or a cursor to be displayed by the display when the first feature matches the second feature.

19. At least one machine readable medium comprising instructions that, when executed by a processor, cause the processer to at least:
detect a user feature associated with a user; and
adjust an operating system setting based on a viewing distance between a display and the user feature.

20. The at least one machine readable medium of claim 19, wherein the user feature is a first feature, and the instructions, when executed, cause the processor to compare the first feature to a second feature from a feature database.

21. The at least one machine readable medium of claim 20, wherein the instructions, when executed, cause the processor to adjust the operating system setting to change a size of at least one of a pointer or a cursor to be displayed by the display when the first feature matches the feature.

22. The at least one machine readable medium of claim 19, wherein the instructions, when executed, cause the processor to dynamically adjust a size of a first object to be displayed on the display responsive to changes in the viewing distance.

23. The at least one machine readable medium of claim 22, wherein the instructions, when executed, cause the processor to adjust the size of the first object while maintaining a native display resolution.

24. A computing system, comprising:
a sensor to collect data representative of a viewing distance between a display and a user of the display; and
scaler instructions to cause adjustment of an operating system setting based on the viewing distance to adjust a size of at least one of a pointer or a cursor to be displayed by the display.

25. The computing system of claim 24, further including the display.

26. The computing system of claim 25, wherein the scaler instructions are to adjust the operating system setting to change a size of at least one of a graphical element, a navigation element, text, an image, a font, or any combination thereof.

27. The computing system of claim 24, wherein the sensor includes at least one of a camera, an infrared camera, an infrared laser projector, a range camera, an infrared distance sensor, a laser rangefinder, an infrared sensor, a stereo camera, a time-of-flight camera, or any combination thereof.

28. The computing system of claim 24, wherein the scaler instructions are to cause an increase in the size of the at least one of the pointer or the cursor responsive to an increase in the viewing distance and to cause a decrease in the size of the at least one of the pointer or the cursor responsive to a decrease in the viewing distance.

* * * * *